United States Patent [19]

Oshima et al.

[11] Patent Number: 4,633,830
[45] Date of Patent: Jan. 6, 1987

[54] DIRECT INJECTION INTERNAL COMBUSTION ENGINE OF COMPRESSION IGNITION TYPE

[75] Inventors: Yujiro Oshima; Masatoshi Yamada; Nobuyuki Mori; Katsuhiko Sugiyama; Taro Aoyama; Akinori Saito; Kazuhiro Kozuka, all of Aichi, Japan

[73] Assignee: K.K. Toyota Chuo Kenkyusho, Aichi, Japan

[21] Appl. No.: 647,496

[22] Filed: Sep. 5, 1984

[30] Foreign Application Priority Data

Sep. 5, 1983 [JP] Japan ................. 58-163006

[51] Int. Cl.⁴ ................. F02F 3/26; F02B 19/08; F02M 51/00
[52] U.S. Cl. ................. 123/276; 123/261; 123/262; 123/472
[58] Field of Search ............... 123/276, 261, 262, 275, 123/251, 282, 285, 283, 255, 263, 281, 472; 239/124

[56] References Cited

U.S. PATENT DOCUMENTS

| 3,469,564 | 9/1969 | Hiereth | 123/276 |
| 3,908,624 | 9/1975 | Miyake et al. | 123/276 |
| 4,286,556 | 9/1981 | Neitz et al. | 123/261 |
| 4,292,947 | 10/1981 | Tanasawa et al. | 123/472 |
| 4,395,983 | 8/1983 | Haonas et al. | 123/262 |
| 4,428,340 | 1/1984 | Nikly | 123/276 |
| 4,444,166 | 4/1984 | Kovacs et al. | 123/276 |
| 4,473,046 | 9/1984 | Aoyama et al. | 123/276 |
| 4,487,178 | 12/1984 | Neitz et al. | 123/262 |
| 4,492,193 | 1/1985 | Neitz | 123/261 |
| 4,497,309 | 2/1985 | Ivanchenko et al. | 123/276 |

FOREIGN PATENT DOCUMENTS

| 345269 | 12/1936 | Italy | 123/276 |
| 521954 | 6/1940 | United Kingdom | 123/276 |

Primary Examiner—Raymond A. Nelli
Attorney, Agent, or Firm—Sughrue, Mion, Zinn Macpeak & Seas

[57] ABSTRACT

A direct injection internal combustion engine of a compression ignition type in which portions of an injected fuel spray which have not been evaporated are prevented from striking the walls of the combustion chamber, and the fuel spray is prevented from catching up the air around it when moving in the combustion chamber, thereby providing an engine having reduced combustion noise, reduced amount of smoke and noxious emissions, and improved fuel economy. A combustion chamber is formed in the piston substantially in the form of a spherical cavity gradually narrowing towards the opening of the cavity at the top surface of the piston. An air intake mechanism swirls intake air supplied to the combustion chamber. A swirl injector injects a fuel spray substantially in the form of a hollow cone having a velocity component in a direction tangential of the central axis of the nozzle. The nozzle is offset from the central axis of the cavity and inclined with respect to the central axis of the cavity so that the fuel spray is injected in a forward direction of a swirl stream of intake air in the cavity.

19 Claims, 13 Drawing Figures

DIRECT INJECTION INTERNAL COMBUSTION ENGINE OF COMPRESSION IGNITION TYPE

BACKGROUND OF THE INVENTION

The present invention relates to a direct injection internal combustion engine of a compression ignition type in which fuel is injected into a cavity formed in a piston to form an excellent mixture gas.

A high-speed direct injection diesel engine of relatively small size is known which has a toroidal combusion chamber in the form of a semi-cylindrical cavity in the top of a piston. A conical protrusion is formed at the center of the bottom of the cavity to provide an annular recess. A multi-hole nozzle (having four or five holes) is arranged, as a fuel injection valve, at the center of the cavity. The nozzle injects a spray of fuel radially, and the fuel evaporates while passing across a swirl stream formed in the cavity, thus forming mixture gas.

The fuel spray injected by the nozzle has a large velocity and a strong penetration force in the axial direction of the nozzle hole. Therefore, while passing through the high temperature air in the cavity, the fuel spray evaporates gradually, the diameters of the fuel droplets in the spray decrease, and the flight velocity of the droplets also decreases. Accordingly, the fuel spray is caused to flow by the swirl stream formed in the cavity, thus forming mixture gas in the swirl stream near the downstream walls of the cavity.

Immediately after this conventional diesel engine is started, namely when the engine is operating at low temperature, the temperature of the walls of the cavity is also low, the air temperature is not elevated during the compression stroke, and thus the temperature of the swirl stream formed in the cavity is not so high. Accordingly, the speed of evaporation of the sprayed fuel droplets is low. In other words, the fuel spray does not sufficiently evaporate, as a result of which large unevaporated fuel droplets strike against the walls of the cavity. Accordingly, smoke is generated, the rate of pressure rise is high, the noise level is high, and undesired hydrocarbons (HC) are formed. These are disadvantages accompanying the conventional diesel engine.

Also, for normal low-speed operation, the swirl stream formed in the cavity is weak, and in this case too the sprayed fuel droplets strike against the walls of the cavity causing the same difficulties as for cold running.

The swirl stream in the cavity is generally formed by an intake port which is helical in configuration, namely, a helical port. However, during low speed operation of the engine in which the piston is moving at a low speed, the velocity of the swirl stream is low, and therefore the swirl stream cannot sufficiently decelerate the radial movement of the fuel spray imparted by the multi-hole nozzle so that in this case as well the sprayed fuel droplets strike against the walls of the cavity.

On the other hand, during high speed operation of the engine, the piston is moving at a high speed, and therefore the velocity of the swirl stream formed in the cavity is high. In this case, mixture gas layers formed near the walls of the cavity are caused to flow; that is, the mixture gas layers formed by adjacent injection holes tend to overlap, forming a mixture gas of excessively high concentration, with the result that smoke is generated.

In small engines for automobiles, and especially in engines whose cylinder diameters are of the order of 75 to 100 mm, the range of engine running speed is wide; the idling speed is 500 to 800 rpm and the maximum speed is 4000 to 5000 rpm. Thus, such engines have a problem of forming a mixture gas of excessively high concentration.

The fuel spray injected by only one of the injection holes of the multi-hole nozzle will now be considered. The sprayed fuel droplets have a generally very high velocity, which causes air to be pushed in front of the spray. The velocity of the fuel spray decreases as the fuel spray evaporates. As a result, fuel spray is caught up in and driven by the swirl stream, thus forming mixture gas. Ignition is initiated near the high temperature wall of the cavity near the side surface of the front end of the spray. There is a sufficient amount of air on the surface of the fuel spray, which is in the form of a solid cone, and therefore after ignition near the front end of the fuel spray, not only the mixture gas layer located downstream of the swirl stream but also the surface layer of the fuel spray which has been just injected is combusted. That is, immediately after ignition the velocity of combustion is so high that there is no time to efficiently use the available intake air in the cavity, and accordingly smoke is liable to be generated. Furthermore, as the rate of pressure rise is high, the noise of combustion is also large.

In another type of conventional direct injection diesel engine, a combustion chamber is provided by forming a three-quarter spherical cavity in the top of the piston. The air is swirled by a helical port so that a swirl stream is formed in the cavity at the end of the compression stroke. This diesel engine has found practical use in some fields.

In this diesel engine, the fuel, injected by a single-hole nozzle or a double-hole nozzle, is sprayed against the walls of the cavity, thus forming a fuel film on the wall. The fuel film is evaporated on the cavity wall. The vapor of the fuel thus evaporated is driven by the swirl stream inside the cavity to form a mixture gas.

Compared with the first-described diesel engine having a toroidal combustion chamber, the second-described diesel engine is advantageous in that, as only the fuel vapor which is formed by evaporation of the fuel film is mixed with air for combustion, the quantity of smoke generated is small. However, the latter diesel engine is still disadvantageous in that the combustion characteristics are strongly affected by the temperature of the wall, the engine is difficult to start at low temperatures, and a large amount of noxious emissions, particularly hydrocarbons, is exhausted immediately after starting.

In order to solve the above-described problems accompanying conventional small compression ignition type direct injection internal combustion engines, the inventors have conducted systematic experiments, analyses and trial manufacture, and accomplished this invention.

SUMMARY OF THE INVENTION

An object of the present invention is to eliminate the above-described difficulties accompanying a conventional diesel engine, that is, to prevent the portions of the fuel spray which are not evaporated from striking the walls of the combustion chamber to prevent as much as possible the fuel spray from catching up the air around it while the fuel spray is moving in the combustion chamber, to reduce the rate of combustion pressure rise immediately after ignition, to decrease the combustion noise, and to reduce the quantity of smoke generated.

Provided according to the invention is a direct injection internal combustion engine of a compression ignition type in which air is sucked into a combustion chamber and compressed by a piston, and fuel is injected thereinto so as to be ignited and combusted, which, according to the invention, comprises: an air intake mechanism having swirling means which swirls intake air supplied to the combustion chamber; a combustion chamber formed as a substantially spherical cavity in the top of a piston with the cavity gradually narrowing towards the opening thereof; and a swirl injector for injecting sprayed fuel droplets substantially in the form of a hollow cone which has a velocity component in the tangential direction from the injection port thereof which is offset from the central axis of the cavity and inclined with respect to the central axis of the cavity so that the fuel spray is injected in the forward direction of a swirl stream of intake air inside the cavity.

BRIEF DESCRIPTION OF THE DRAWINGS

FIGS. 7 through 9 are diagrams used for a description of an example of a compression ignition type direct injection internal combustion engine according to the invention, of which

DESCRIPTION OF THE PREFERRED EMBODIMENTS

Figure 1A:
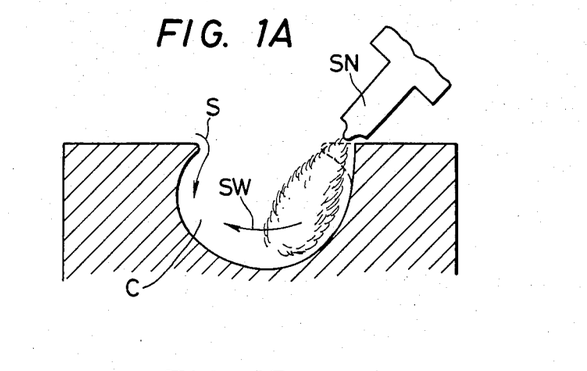
FIG. 1A is a vertical cross-sectional view of a piston of a diesel engine used for a description of the invention.
Figure 1B:
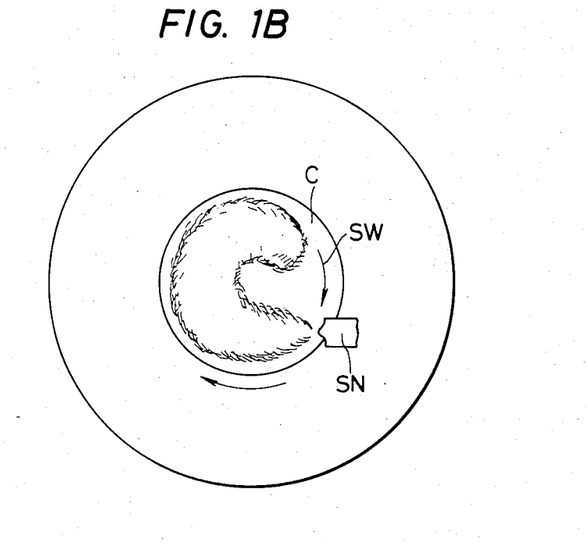
FIG. 1B is a top plan view of the same.
Figure 2:
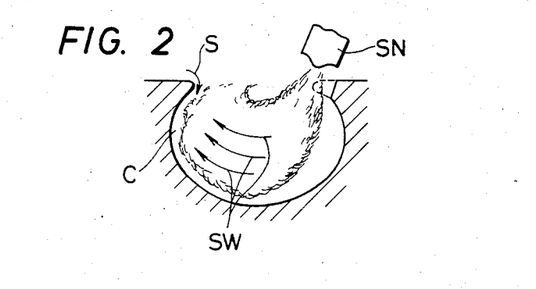
FIG. 2 is a vertical cross-sectional view of another piston.

In the direct injection internal combustion engine of the compression ignition type according to the invention, as shown in FIG. 1A, the air intake forms a swirl stream SW of intake air in the cavity C in advance. The nozzle of a swirl injector SN, which is positioned in the forward direction of the swirl stream and offset from the central axis of the cavity and inclined with respect to the central axis of the cavity, injects a hollow cone-shaped fuel spray which has a velocity component in the tangential direction, and which does not catch up the air around the fuel spray. This fuel spray has a small penetration force, low velocity of movement, and small droplet diameter, and is smoothly driven by the swirl stream without disturbing the flow pattern so that it is dispersed circumferentially of the cavity C in the form of a doughnut, as shown in FIGS. 1B and 2. The sprayed fuel droplets thus dispersed are further dispersed in the direction of the axis of the cavity (downwardly) by a squish flow S formed as the piston rises, and it flows into the cavity C through the opening from the flat part of the piston near the end of the compression stroke. While being dispersed circumferentially and downwardly of the cavity C, the fuel spray, which is a group of tiny fuel droplets, evaporates to mix with the intake air, forming a mixture gas layer in the form of a doughnut in the cavity, as shown in FIG. 1B. Ignition initiates at a point or a plurality of adjacent points near the front end of the mixture gas layer, and the fuel spray is injected in the direction of the swirl stream at the part of the cavity where the velocity of the swirl stream is higher. Since the velocity of the fuel spray itself is low, the fuel spray does not catch up the air around it. Therefore, during the initial period of combustion, the fuel spray which has been just injected and is in the form of a hollow cone will not be combusted immediately, that is, combustion gradually advances from the front end of the fuel spray, which has been dispersed in the form of a doughnut or circumferentially by the swirl stream, towards the upstream part as shown in FIG. 1B. Accordingly, the amount of smoke produced is small, and the rate of combustion pressure rise is also small, and therefore the noise level is low. In addition, as the air in the cavity is effectively utilized, the specific fuel consumption is reduced. These are some of the effects or merits of the internal combustion engine of the invention.

Furthermore, in the internal combustion engine of the invention, the cavity C is substantially spherical. Therefore, the swirl stream SW and the squish flow S are formed uniformly along the wall of the cavity C to the extent that there is no dead space in the cavity C, which makes it possible to form a good mixture gas layer or region in the cavity C.

The effects of the direct injection internal combustion engine of the compression ignition type will now be described in more detail.

In the internal combustion engine of the invention, after the intake (suction) stroke, the swirl stream SW of intake air is formed in the cavity C, and after the start of the compression stroke, the squish flow S flows into the cavity C from the flat part of the top of the piston.

The swirl injector injects a fuel spray, which has a small penetration force and a small velocity, into the cavity in the flow direction of the swirl stream formed, shown in FIG. 1A. As the fuel, having the swirling motion imparted by the slit of the injection valve and injected in the form of a hollow conical film parts from the nozzle, its diameter increases while its thickness decreases, as a result of which the film is broken into tiny droplets, that is, fuel spray is formed. The fuel spray injected by the swirl injector as described above have both a velocity component in the axial direction of the nozzle and a velocity component in the tangential direction. This fuel spray has a small velocity and penetration force, and accordingly a very small travel distance and good atomization compared with fuel spray injected by the conventional multi-hole nozzle.

The sprayed fuel droplets injected in the direction of the swirl stream in the cavity, having a low velocity and a small penetration force, will not catch up the air around it. Therefore, when the fuel spray enters the swirl stream, as shown in FIGS. 1B and 2, it readily flows circumferentially in the cavity near the wall of the cavity and is smoothly driven by the swirl stream, thus being dispersed circumferentially in the cavity.

The sprayed fuel droplets (atomized sprayed fuel droplets) are driven by the swirl stream in the cavity and are formed mainly in the middle and upper region. The sprayed fuel droplets thus dispersed form a mixture gas layer in the form of a doughnut along the walls of the combustion chamber while being moved by the swirl stream.

Thus, the internal combustion engine of the invention is fundamentally different in its mixture gas forming mechanism from the conventional toroidal type engine in which the fuel spray forms the mixture gas while catching up the air around it with a strong penetration force, or the conventional engine in which a fuel film is formed on the walls of the cavity and then evaporated.

As the fuel injected in the form of a hollow conical film by the swirl injector is atomized, its velocity quickly decreases and the fuel spray is reduced in volume because of the density of the gas surrounding it. As a result, the fuel spray, while mixing with the air and evaporating, is dispersed circumferentially in the cavity by the swirl stream so as to be distributed around the periphery of the cavity by the squish flow which flows in the same direction.

Ignition initiates at one point or a plurality of adjacent points near the front end of the mixture gas. In the engine of the invention, unlike the conventional toroidal type engine in which fuel sprays are injected radially from the center of the cavity where the velocity of the swirl is low, the fuel spray is injected in the direction of the swirl stream to the peripheral part of the cavity where the velocity of the swirl stream is high and the velocity of the fuel spray is low, and therefore the fuel spray will not catch up the air around it. Accordingly, during the initial period of combustion, the fuel spray which has just been injected by the swirl injection will not burst into flame immediately; that is, the flame advances gradually from the ignition point towards the downstream end of the region where the mixture gas is formed through the dispersion of the fuel spray by the swirl stream. Thus, combustion gradually advances while effectively utilizing the intake air flow in the cavity.

Accordingly, the internal combustion engine of the invention is advantageous in the following points: The quantity of smoke generated and exhausted is small, and the rate of combustion pressure rise is low, and therefore the amount of noise produced is small. In the cavity, the intake air and the sprayed fuel droplets are well diffused and mixed, and the intake air in the cavity is effectively used. Therefore, with this internal combustion engine, even a small quantity of fuel can be ignited for combustion. Furthermore, the output characteristics and the fuel consumption characteristics are improved with the use of the invention.

Figure 3A:
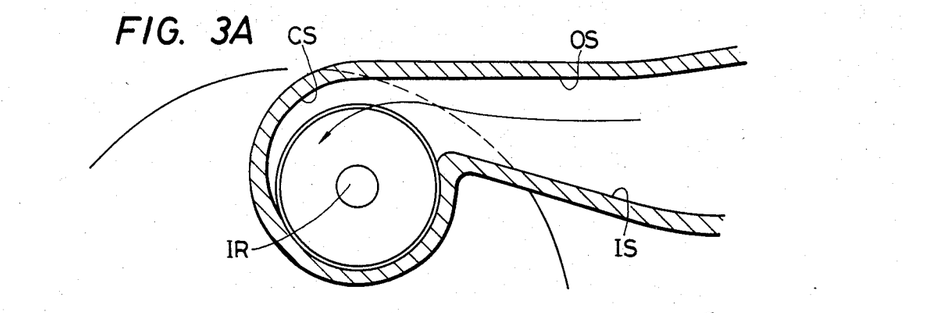
FIGS. 3A and 3B are, respectively, a top cross-sectional view and a vertical cross-sectional view of a first aspect of an engine of the invention.
Figure 3B:
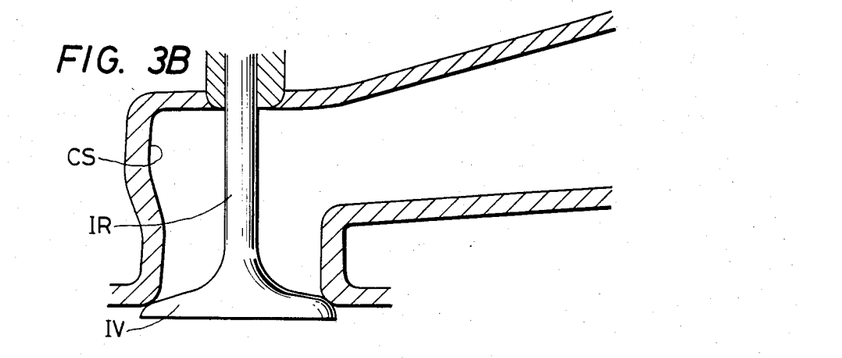

The invention can be practiced as follows:

In a direct injection internal combustion engine of a compression ignition type constructed according to a first embodiment of the invention, the intake valve arrangement as shown in FIGS. 3A and 3B is implemented with an offset port designed so that the side wall IS of the intake passage, which is near the center of the piston, gradually inclines outwardly, with an extension line of the inclined side wall extending within the region from the outer wall of the rod IR of an intake valve IV to a position apart from the outer wall thereof. The side wall OS of the intake passage, which is on the side of the periphery of the piston, is linear and smoothly merges with the arcuate side wall CS, the center of which is shifted toward the periphery of the piston with respect to the central axis of the intake valve IV.

In the case of a conventional helical port, a large capacity spiral chamber is formed in the valve chamber and the intake passage is bent spirally. Therefore, the air resistance is high during high speed operation of the engine. However, as described above, in accordance with this first aspect of the invention, the intake valve arrangement includes an offset port. That is, no large-capacity spiral chamber is formed in the valve chamber, and therefore the sucked air flows smoothly without striking the rod IR of the intake valve IV. Thus, this aspect of the invention is advantageous in that the air resistance is low and the intake air volume efficiency is not lowered during high speed operation of the engine.

In accordance with the first aspect of the invention, as shown in FIG. 3A, the intake port extends tangential to the cylinder. Therefore, the first aspect brings about the advantage in that the speed distribution of a swirl stream formed in the cylinder approaches that of a solid vortex, compared with a helical port, and the part of the swirl stream which moves at the highest speed closely approaches the inner wall of the cylinder. When the maximum speed distribution of the swirl stream is near the inner wall of the cylinder, the speed of the swirl stream in the cavity at the end of the compression stroke is increased. The air resistance of the intake mechanism depends on the maximum air velocity. Therefore, generally as the maximum speed distribution of the swirl stream closely approaches the periphery in the suction stroke, the intake air volume efficiency of the engine increases with the speed of the swirl stream in the combustion chamber unchanged. This brings about the practical advantage that the torque of the engine is increased during high speed operation of the engine.

As described above, in accordance with the first aspect of the invention, scattering of the fuel spray circumferentially in the cavity depends on the swirl stream of intake air. Therefore, the engine requires a strong swirl stream compared with a conventional toroidal type engine. In general, the swirl ratio (obtained by dividing the angular velocity of swirl by that of the engine) used for measuring the strength of a swirl stream in the combustion engine should be in a range of 2.6 to 4, more preferably, 3 to 3.7.

Figure 4A:
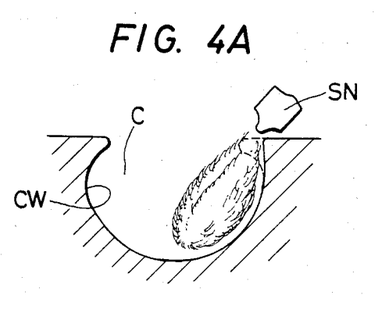
FIGS. 4A and 4B are, respectively, a vertical cross-sectional view and a top cross-sectional view showing respective second and third aspects of an engine of the invention.

In a compression ignition type direct injection internal combustion engine constructed in accordance with a second aspect of the invention, the spherical cavity is designed so that, as shown in FIG. 4A, the configuration of its walls conforms to that of the shape of the sprayed fuel droplets injected by the swirl injector.

In accordance with the second aspect of the invention, the wall of the spherical cavity conforms to the shape of the fuel spray injected by the swirl type injection nozzle as described above. Therefore, the second aspect of the invention brings about the advantage that the fuel spray will not stick to or collide with the walls of the cavity. The diameter of the opening CO of the cavity is smaller than the diameter of the cavity itself, and the opening has a cut EG as shown in FIG. 4B to prevent mechanical contact with the swirl type injection nozzle and blocking of the fuel spray.

Figure 4B:
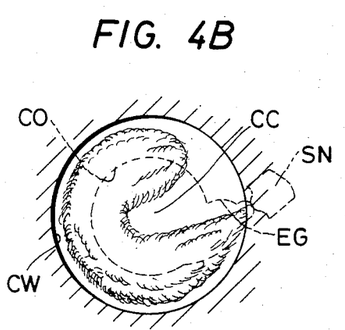

In a direct injection internal combustion engine of a compression ignition type constructed in accordance with a third aspect of the invention is that the position and direction of the swirl injector is determined so that, when fuel spray is formed by the swirl injector, the spray thus formed is confined between the central axis CC of the cavity and the wall CW of the cavity as shown in FIG. 4B.

In accordance with the third aspect of the invention, dispersion of the fuel spray from the central axis CC of the cavity to the wall CW is achieved by appropriately setting the fuel spray angle from the swirl type injection nozzle SN, thus preventing the fuel spray from sticking to or striking against the wall CW of the cavity and preventing the spray from passing beyond the central axis CC of the cavity.

In accordance with a fourth aspect of the direct injection internal combustion engine of the compression ignition type of the invention, the opening of the cavity is formed so that the cavity contraction ratio (the ratio of the arena of the opening of the spherical cavity to the total area of the top of the piston) is in a range of 0.05 to 0.12.

In accordance with the fourth aspect of the invention, the cavity's contraction ratio is selected to be in the above-described range. This is advantageous in that, with the aid of the squish flow, the fuel spray is supplied towards the bottom of the cavity of compensate for the force of penetration of fuel injected by the swirl type injection nozzle, which is relatively reduced compared with the strength of the swirl stream for high speed operation of the engine. If the squish flow is excessively strong, then the strength of the turbulent flow in the cavity is increased, as a result of which the thermal loss is increased. The fuel consumption is also increased.

In accordance with a fifth aspect of a direct injection internal combustion engine of a compression ignition type of the invention, the cavity is formed so that the ratio of the volume of the cavity to the total clearance volume between the piston at the top dead center and the cylinder head is in the range of 0.6 to 0.80.

Accordingly, with the volume of the cavity determined as described above, the quantity of intake air necessary for combustion is held in cavity, thus preventing any decrease of torque and eliminating difficulties involved in the manufacture of the engine and collision of the piston against the cylinder head when the engine is running.

Figure 5:
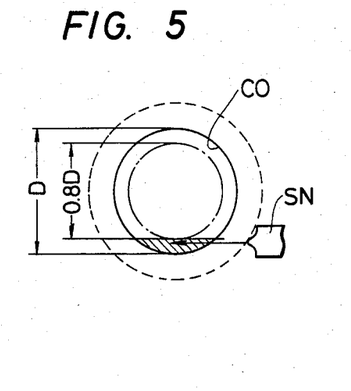
FIG. 5 is a plan view showing a sixth aspect of the invention.

In accordance with the a sixth aspect of a direct injection internal combustion engine of a compression ignition type of the invention, as shown in FIG. 5, the central axis of the nozzle of the swirl type injection nozzle SN is extended inside the wall of the opening CO of the cavity and outside a circle whose diameter is 0.8D, where D is the diameter of the opening CO.

As is apparent from the above description, in accordance with the sixth aspect of the invention, the nozzle of the swirl type injection nozzle is directed to the region in the cavity where the swirl stream is strong. This brings about the advantage that the squish and swirl streams disperse the sprayed fuel droplets circumferentially and downwardly in the cavity, thus forming excellent mixture gas, specifically, the sprayed fuel droplets are dispersed circumferentially and the strong squish flow is utilized near the top dead center.

Figure 6:
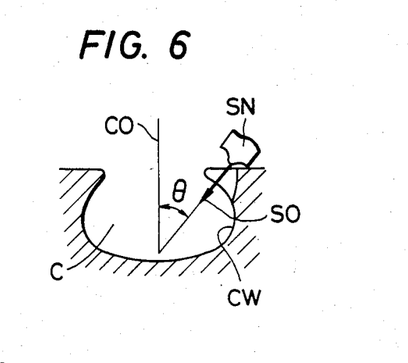
FIG. 6 is a vertical cross-sectional view showing a seventh aspect of the invention.

In accordance with a seventh aspect of a direct injection internal combustion engine of a compression ignition type of the invention, as shown in FIG. 6, the angle $\theta$ between the central axis SO of the nozzle of the swirl injector and the central axis CO of the cavity is in a range of 30° to 70°.

With the angle $\theta$ of the nozzle of the swirl injector with respect to the central axis of the cavity defined as described above, the seventh aspect is advantageous in that the fuel spray will not stick to or strike against the wall CW of the cavity C.

A first embodiment of the above-described compression ignition type direct injection internal combustion engine will be described.

A specific feature of this embodiment, represented by the first through seventh aspects of the invention enumerated above, resides in that a swirl stream is formed in advance in a cavity 2 in the top of a piston 1 so as to cause a fuel spray injected by a swirl type injection nozzle 3 to disperse circumferentially in the cavity 2, with the aid of a squish flow, which is maintained until the end of the compression stroke. The fuel spray is dispersed downwardly in the cavity 2 so that the fuel is sufficiently evaporated to mix well with the intake air, thereby forming excellent mixture gas in the cavity 2. The mixture gas thus formed is ignited to gradually burn the fuel spray dispersed downstream thereof.

Figure 7:
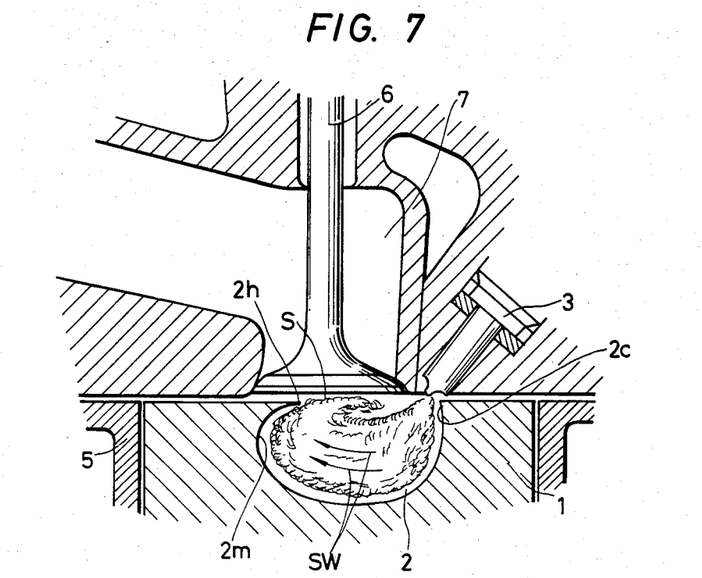
FIG. 7 is a vertical cross-sectional view showing the engine.
Figure 8A:
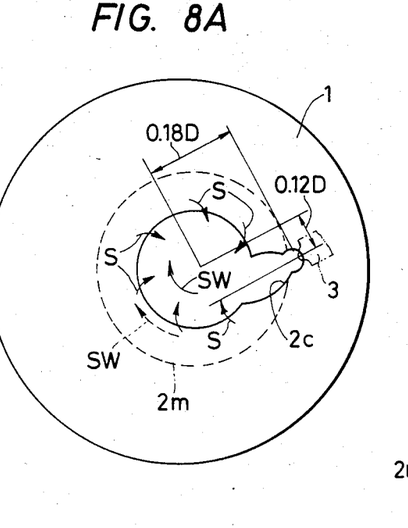
FIG. 8A is a plan view showing a piston of the engine.

These actions will be described in more detail with reference to FIGS. 7, 8 and 9. As shown in FIG. 7, the substantially spherical cavity 2 is formed in the flat top of the piston 1, which reciprocates in the cylinder 5, substantially at the center of the piston. The cavity 2 is shaped such that, as shown in FIG. 7, its cross section is in the form of a circle whose diameter varies with the level of the cross section, and the vertical section has the configuration of two ellipses of different curvatures on opposite sides of the maximum diameter $2m$. The diameter of the opening $2h$ of the cavity 2 is smaller than those of other parts, and the total area of the opening, including a cut described below, is 9.8% of the total area of the piston 1. This is done to make the squish flow S flowing into the cavity 2 more suitable. In order to prevent the swirl type injection nozzle 3 and the fuel spray from the outlet of the injection nozzle 3 from striking against the opening $2h$, a substantially U-shaped cut 2C is formed in the top of the piston merging with the opening $2h$ near the nozzle of the swirl injector as shown in FIG. 8A. Furthermore, by taking the utilization of air in combustion into account, the dimensions of the cavity 2 are selected so that the volume thereof is 72% of the volume of the combustion chamber with the piston at the top dead center.

In the above-described engine, the compression ratio, determined by the volumes when the piston is at top dead center and at bottom dead center, is set to 17. In this engine, due to the employment of the swirl type injection valve, fuel is atomized sufficiently, and thus it is unnecessary to set the compression ratio to a high value. If the compression ratio is excessively high, then the ignition delay time becomes short, thus resulting in the generation of smoke. If the compression ratio is excessively low, ignition is not carried out satisfactorily. Thus, the compression ratio should be in the range of 14 to 20.

The fuel injector is a slit swirl type injection nozzle 3 which, as shown in FIG. 7, penetrates the cylinder head 4 and is mounted with its outlet confronting the cut $2c$ of the cavity 2. That is, the opening of the swirl type injection nozzle 3 extends in the direction of forward flow of the swirl stream SW formed in the cavity 2, and the tip of the nozzle is offset by 0.18D (D is the diameter of the piston) from the central axis of the cavity. The length of a perpendicular line from the central axis of the nozzle to the central axis of the cavity 2 is 0.12D. The angle $\theta$ between the central axis of the injection port and the central axis of the cavity 2 is 45°.

Figure 9:
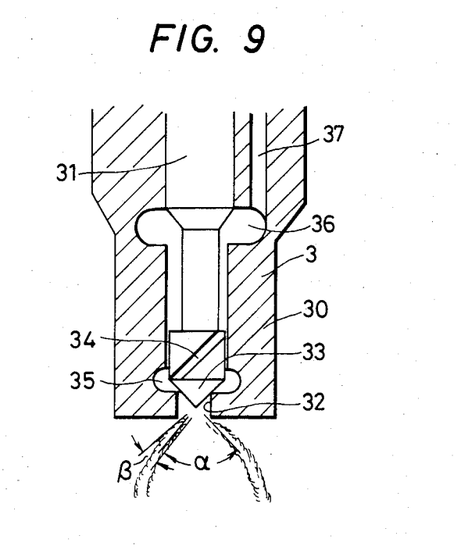
FIG. 9 is a vertical cross-sectional view showing a swirl injector in the engine.

The swirl type injection nozzle 3, as shown in FIG. 9, is composed of a nozzle body 30, which is a hollow cylindrical member which is elongated at the end, and a needle member 31, which is a stepped rod inserted into the nozzle body 30. A swirl chamber 35 is formed in the end portion of the nozzle body 30, and an injection hole 32 is formed in the lower end of the nozzle body 30 coaxial with the nozzle body and communicating with the swirl chamber 35. The needle member 31 has a conical end 33 which abuts against the injection hole 32 in such a manner as to close the latter. The conical end 33 is formed by machining the larger-diameter part of the needle member 31. Two slits 34 (only one of which is shown in FIG. 9) are cut in the cylindrical wall of the larger diameter part of the needle member 31 in such a manner that they form a predetermined angle with respect to the central axis of the needle valve so that the swirl chamber 35 is communicated with a chamber 36, which is in turn communicated through a fuel supply passage 37 to a distribution type fuel pump (not shown).

In the swirl injector, the angle, sectional area and length of the slits, the dimensions of the swirl chamber 35 and the diameter and length of the injection hole 32 are determined so that, with the distance between the center of the cavity 2 and the wall taken into account, the injection valve forms a hollow conical spray pattern, and the spray angle α (FIG. 9) of the spray pattern is 40° (at atmospheric pressure). It has been found through experiments that the best result is obtained when the diameter of the injection hole 32 is in the range of 0.3 mm to 1.0 mm. In the present example, the diameter of the injection hole 32 is 0.6 mm.

The spray angle α of the fuel is effective when it is in the range of 25° to 60° (at atmospheric pressure). If the angle is excessively small, the fuel is not sufficiently dispersed circumferentially of the cavity 2, and if it is excessively large, the density of the mixture gas at the center of the cavity is increased, which may lead to the phenomenon of so-called thermal pinch.

In FIG. 9, an angle β represents the thickness of the hollow conical fuel spray. The angle β should not be large for it affects the atomization, and preferably is in the range of 5° to 15°.

The total injection period of the swirl type injection valve is set to about 12° for an engine speed of 1200 rpm, and to about 29° for an engine speed of 4000 rpm. The injection pressure (pressure at the valve opening) is about 160 kg/cm².

As shown in FIG. 7, the intake valve 6 is inserted into the cylinder head 4, and an offset port 7 having a predetermined swirl ratio 3.6 is formed in the intake passage where the intake valve 6 is arranged.

The offset port 7 is similar to that shown in FIGS. 3A and 3B, the former differing from the latter only in the direction of arrangement. Therefore, a detailed description of the offset port 7 will not be made.

Figure 8B:
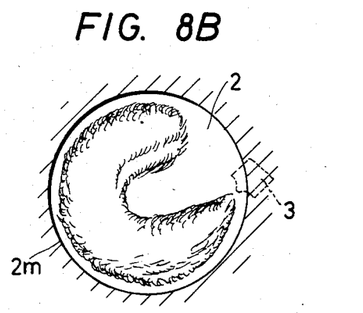
FIG. 8B is a cross-sectional view showing a cavity in the piston of the engine.

In the direct injection internal combustion engine of the compression ignition type thus constructed, the swirl stream SW is formed in the cavity 2 by the offset port 7 in advance, and a substantially hollow conical fuel spray having velocity components in tangential directions and a suitable spray angle is injected from the injection hole 32 of the swirl injector 3 in the forward direction of the swirl stream SW so that, as shown in FIG. 8B, the swirl stream SW smoothly disperses the sprayed fuel droplets circumferentially of the cavity 2 in such a manner that the sprayed fuel droplets is dispersed substantially in the form of a ring. The squish flow S which flows into the cavity through the opening 2h from the flat part of the top of the piston 1 near the end of the compression stroke further disperses the sprayed fuel droplets, which has been dispersed circumferentially of the cavity 2, downwardly in the cavity 2. That is, in the example, the fuel is dispersed as follows: The swirl type injection nozzle is utilized to disperse the sprayed fuel droplets radially of the cavity, the swirl stream SW is utilized to disperse the sprayed fuel droplets circumferentially of the cavity, and the squish flow S is used to disperse the sprayed fuel droplets downwardly of the cavity. During this dispersion, the sprayed fuel droplets evaporate gradually. However, it should be noted that the engine is designed so as to prevent the sprayed fuel droplets from sticking to or striking against the wall of the cavity 2 and to prevent overlapping of the sprayed fuel droplets, thereby preventing the formation of an excessively high-density mixture gas. In the example, the mixture gas in the cavity 2 is formed into an annular shape.

Approximately 0.7 to 1 msec after the injection of fuel, ignition occurs at the front end of the fuel spray. The velocity of the swirl stream SW formed in the cavity 2 is high, and the velocity and the penetration force of the hollow conical sprayed fuel droplets in the axial direction of the nozzle are small, and therefore the hollow conically sprayed fuel droplets do not significantly catch up the air around them. Accordingly, because of this mixture formation, unlike the conventional engine using a toroidal system, the hollow conically sprayed fuel droplets which have just been injected by the swirl injector and have not evaporated yet are not surrounded immediately by the flame. That is, the combustion advances in the forward direction of the swirl and then gradually in a direction opposite the direction of the swirl toward the end of the combustion period, burning a part of the sprayed fuel droplets which are forming mixture gas while being dispersed circumferentially of the cavity 2 by the swirl stream SW. Accordingly, in the engine of the invention, unlike the conventional engine, the amount of smoke and soot formed is very small.

If the spray angle of the spray of the swirl type injection valve is excessively large, then the spray will reach the central region of the cavity 2. The intake air does not reach this region owing to the centrifugal force of swirl rotation so that the spray does not mix with the air sufficiently, and therefore soot is formed therein. In order to eliminate this difficulty, in the example under discussion, the spray angle is set to 40°. In general, the output of a diesel engine is limited by the concentration of soot. Therefore, the output can be increased by suppressing the formation of soot; that is, a high power diesel engine can be obtained.

In the above-described engine, in the range of from low speed to high speed, combustion is carried out by efficiently using the air in the cavity 2. Therefore, the specific fuel consumption of the engine is decreased, and the output torque increased. Furthermore, in the engine of the invention, unlike the conventional engine in which combustion occurs explosively, the combustion advances gradually. Therefore, the engine of the invention is advantageous in that it has a low rate of pressure rise and level of combustion noise. Furthermore, in the above-described engine, the overall noise level generated in the idling state, which if high is very disturbing to the operator, is lower by as much as 3 to 4 dB than in an ordinary diesel engine, and especially the combustion noise in the frequency band of 1 to 5 kHz is extremely low.

While preferred embodiments of the invention have been described in detail, it is particularly understood that the invention is not limited thereto or thereby, and it is evident to those skilled in the art that various changes and modifications may be made therein without departing from the invention.

We claim:

1. A direct injection internal combustion engine of a compression ignition type in which air is sucked into a combustion chamber and compressed by a piston, and fuel is injected directly thereinto so as to be ignited and combusted, comprising:

air intake means having swirling means for swirling intake air supplied to said combustion chamber;

a piston having a combustion chamber substantially in the form of a spherical cavity formed in a top portion of said piston, said cavity having walls which gradually converge towards an opening of said cavity at a top surface of said piston;

a swirl injector for injecting a fuel spray having substantially the form of a hollow cone, said sprayed fuel having a velocity component in a tangential direction of a central axis of an injection port of said injector, said injection port being offset from a central axis of said cavity and being inclined with respect to said central axis of said cavity such that said fuel spray is injected in a forward direction of a swirl stream of intake air formed in said cavity, and wherein said air intake means comprises a port located offset from a central axis of a cylinder of said engine, said offset port having an intake passage, an inner side wall of said intake passage having an inclination sloping gradually toward a periphery of said cylinder as said passage approaches said cylinder, said inclined side wall being arranged such that an extension line of said inclined side wall extends within a region from an outer wall of a rod of an intake valve to a position apart from said outer wall; an outer side wall of said intake passage near a periphery of said piston being linear and smoothly connecting with an arcuate side wall of said intake passage, said arcuate side wall defining a center offset toward said periphery of said cylinder with respect to a central axis of said intake valve.

2. A direct injection internal combustion engine of a compression ignition type as claimed in claim 1, wherein said cavity is shaped so as to conform to a shape of a sprayed fuel droplet pattern obtained immediately after said swirl injector injects said fuel spray.

3. A direct injection internal combustion engine of a compression ignition type as claimed in claim 1, wherein said swirl injector is so positioned and oriented that a fuel spray pattern obtained immediately after said swirl injector injects said fuel spray is located between said central axis of said cavity and a wall of said cavity.

4. A direct injection internal combustion engine of a compression ignition type as claimed in claim 1, wherein said opening of said cavity is formed so that a ratio of an area of said opening to a total area of said top of said piston is in a range of 0.05 to 0.12.

5. A direct injection internal combustion engine of a compression ignition type as claimed in claim 4, wherein said cavity is formed so that a ratio of a total volume of said cavity to a volume between said piston and a cylinder head of said engine when said piston is at top dead center is in a range of 0.6 to 0.80.

6. A direct injection internal combustion engine of a compression ignition type as claimed in claim 1, wherein said central axis of said nozzle of said swirl injector extends inside a wall of said opening of said cavity and outside a circle whose diameter is 0.8D, where D is a diameter of said opening.

7. A direct injection internal combustion engine of a compression ignition type as claimed in claim 1, wherein said swirl injector is so arranged that an angle between said central axis of said injection port of said swirl injector and said central axis of said cavity is in a range of 30° to 70°.

8. A direct injection internal combustion engine of a compression ignition type as claimed in claim 1, wherein an extension of said side wall of said intake passage contacts an outer surface of a rod of an intake valve of said engine.

9. A direct injection internal combustion engine of a compression ignition type as claimed in claim 1, wherein a diameter of an injection hole of said nozzle is in a range of 0.3 to 1.0 mm.

10. A direct injection internal combustion engine of a compression ignition type as claimed in claim 1, wherein a spreading angle of said sprayed fuel is in a range of 25° to 60° at atmospheric pressure.

11. A direct injection internal combustion engine of a compression ignition type as claimed in claim 1, wherein an angle corresponding to a thickness of said hollow cone is in a range of 5° to 15°.

12. A direct injection internal combustion engine of a compression ignition type as claimed in claim 7, wherein said tip of said nozzle is offset by 0.18D from the central axis of said cavity, and the length of a perpendicular line from the central axis of said nozzle to the central axis of said cavity is 0.12D, where D is the diameter of said piston.

13. A direct injection internal combustion engine of a compression ignition type as claimed in claim 1, wherein said fuel injection nozzle comprises a swirl injection nozzle of the slit type, comprising a nozzle body having an injection port at an end portion thereof, a needle tip inserted into said nozzle body and having a groove-shaped slit extending along an outer circumferential wall thereof and a conical tip portion at an end portion thereof.

14. A direct injection internal combustion engine of a compression ignition type as claimed in claim 1, wherein said cavity is shaped such that its cross section is in the form of a circle whose diameter varies with the level of the cross section, and such that its vertical section has the configuration of two ellipses of different curvatures on opposite sides of the maximum diameter $2m$.

15. A direct injection internal combustion engine of a compression ignition type as claimed in claim 1, wherein the total area of the opening is 9.8% of the total area of said piston.

16. A direct injection internal combustion engine of a compression ignition type as claimed in claim 5, wherein the dimensions of the cavity are selected so that the volume thereof is 72% of the volume of said combustion chamber with said piston at the top dead center.

17. A direct injection internal combustion engine of a compression ignition type as claimed in claim 7, wherein the angle $\theta$ between the central axis of said injection port and the central axis of the cavity is 45°.

18. A direct injection internal combustion engine of a compression ignition type as claimed in claim 1, wherein said swirling means of said air intake means achieves a swirl ratio of 3.6.

19. A direct injection internal combustion engine of a compression ignition type as claimed in claim 2, wherein said cavity opening has a substantially U-shaped opening formed therein by cutting a portion of said cavity opening at the top of the piston near the outlet of said swirl type injection nozzle.

* * * * *